(12) United States Patent
Caffier et al.

(10) Patent No.: US 11,787,226 B2
(45) Date of Patent: Oct. 17, 2023

(54) ERASER TOOL CONTAINING POLYETHERAMINE

(71) Applicant: SOCIETE BIC, Clichy (FR)

(72) Inventors: Guillaume Caffier, Wegscheid (FR); Aurore Sauvage, Gy les Nonains (FR)

(73) Assignee: SOCIETE BIC, Clichy (FR)

( * ) Notice: Subject to any disclaimer, the term of this patent is extended or adjusted under 35 U.S.C. 154(b) by 461 days.

(21) Appl. No.: 17/255,527

(22) PCT Filed: Jul. 30, 2019

(86) PCT No.: PCT/IB2019/056471
§ 371 (c)(1),
(2) Date: Dec. 23, 2020

(87) PCT Pub. No.: WO2020/026129
PCT Pub. Date: Feb. 6, 2020

(65) Prior Publication Data
US 2021/0362536 A1    Nov. 25, 2021

(30) Foreign Application Priority Data

Jul. 31, 2018    (EP) .................................... 18306035

(51) Int. Cl.
*B43L 19/00* (2006.01)
*C08K 5/18* (2006.01)
(Continued)

(52) U.S. Cl.
CPC .......... *B43L 19/0025* (2013.01); *B43K 29/02* (2013.01); *C08K 3/22* (2013.01);
(Continued)

(58) Field of Classification Search
CPC ......... B43K 29/00; B43K 29/02; B43L 19/00; B43L 19/0025; C08K 5/18; C08L 23/16
See application file for complete search history.

(56) References Cited

U.S. PATENT DOCUMENTS

| | | |
|---|---|---|
| 4,622,267 A | 11/1986 | Riecke |
| 2007/0142502 A1 | 6/2007 | Zhu et al. |

FOREIGN PATENT DOCUMENTS

| | | | |
|---|---|---|---|
| BR | 102014025502-8 A2 * | 6/2016 | |
| DE | 3719446 | 12/1988 | |

(Continued)

OTHER PUBLICATIONS

International Search Report dated Oct. 8, 2019 in corresponding PCT International Patent Application PCT/IB2019/056471, 6 pgs.

(Continued)

*Primary Examiner* — Randall E Chin
(74) *Attorney, Agent, or Firm* — Ruggiero, McAllister & McMahon LLC

(57) ABSTRACT

There is an erasing tool having a polyetheramine for erasing a thermochromic ink composition capable of undergoing a color change that cannot be reversed by application of a temperature change. There also is a writing instrument having a thermochromic ink composition and an erasing tool. Finally, there is a method for irreversibly erasing a written line made with a thermochromic ink composition and erased with an erasing tool.

20 Claims, 1 Drawing Sheet

(51) Int. Cl.
    *C08L 23/16*     (2006.01)
    *B43K 29/02*     (2006.01)
    *C08K 3/22*     (2006.01)
    *C08K 3/26*     (2006.01)
    *C09D 11/50*     (2014.01)
    *C08L 71/02*     (2006.01)

(52) U.S. Cl.
    CPC .................. *C08K 3/26* (2013.01); *C08K 5/18* (2013.01); *C08L 23/16* (2013.01); *C09D 11/50* (2013.01); *C08K 2003/2241* (2013.01); *C08K 2003/265* (2013.01); *C08L 71/02* (2013.01)

(56) References Cited

FOREIGN PATENT DOCUMENTS

| | | |
|---|---|---|
| EP | 3480028 | 5/2019 |
| JP | 5739970 | 6/2015 |
| JP | 2015-174437 | 10/2015 |
| JP | 2017-087418 | 5/2017 |
| JP | 2018-1573 | 1/2018 |

OTHER PUBLICATIONS

Written Opinion dated Oct. 8, 2019 in corresponding PCT International Patent Application PCT/IB2019/056471, 3 pgs.
European Search Report dated Dec. 6, 2018 in corresponding European Patent Application No. 18306035, 3 pgs.

\* cited by examiner

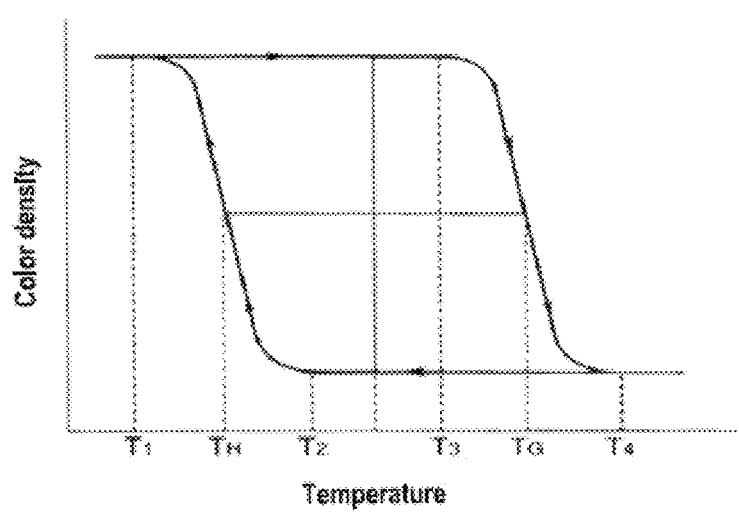

ERASER TOOL CONTAINING POLYETHERAMINE

CROSS-REFERENCE TO RELATED APPLICATIONS

The present application claims benefit of PCT Application No. PCT/1132019/056471, filed on Jul. 30, 2019, now published as WO2020026129, which claims benefit of European Application No. EP 18 306 035.9, filed on Jul. 31, 2018, the entire contents of the foregoing being incorporated herein by reference.

BACKGROUND OF THE DISCLOSURE

1. Field of the Disclosure

The present disclosure relates to an eraser for erasing an irreversible thermochromic ink composition capable of undergoing a color change that cannot be reversed by application of a temperature change. The disclosure concerns an erasing composition comprising a polyetheramine, as well as an erasing tool made of such erasing composition. The disclosure also relates to a writing instrument comprising a thermochromic ink composition and an erasing tool according to the disclosure. Finally, the disclosure aims at a method for irreversibly erasing a written line made with a thermochromic ink composition and erased with an erasing tool according to the disclosure.

2. Description of the Prior Art

Known thermochromic ink compositions often exhibit "hysteresis" associated with the color change, i.e. the color change of written marks made with such inks is reversible. Written marks made using thermochromic ink compositions typically exhibit a colored state at room temperature, change from the colored state to substantially colorless upon application of heat, and change back to the initial colored state when cooled below a certain temperature. The known thermochromic inks typically include a reaction medium which can promote or impede the reaction between a leuco-dye and a developer at certain temperatures, such that the leuco-dye is present in its colorless form at certain temperatures which are typically substantially above room temperature.

However, the reversibility of the color change can be particularly undesirable in certain situations, for example, if the consumer does not wish for the original written marks to be "re-revealed".

JP2015174437 provides an erasing tool for color changing or decoloring a line written/drawn using writing implement ink or a color pencil containing at least a leuco-dye, a developer and a crystalline substance, as well as a decoloring agent chosen from primary or secondary amines.

JP2017087418 provides erasing tools which can erase handwriting of irreversible discoloration inks, the tools comprising a mixture of fillers and resins selected among high density polyethylene, nylon or polyacetal.

However, the erasing tools mentioned in the above-referenced patent documents have the disadvantages of leaving yellow traces and showing exudation on the paper. Furthermore, they comprise amines which have high melting points requiring an important strength from the end-user to melt the amines, and completely erase the ink. Accordingly, there is a need for more efficient and easy to use erasing tools for irreversibly erasing thermochromic ink compositions.

SUMMARY OF THE DISCLOSURE

The inventors have now surprisingly found that it is possible to irreversibly erase a thermochromic ink composition deposited on a paper without any trace or exudation by heating and/or by mechanical action (friction), and without requiring an important erasing-strength from the end-user, by using an erasing tool made of polyetheramine.

Thus, the present disclosure relates to an erasing composition comprising:

(a) from 10 to 80% by weight of at least one rubber, (b) from 20 to 80% by weight of at least one filler, and (c) from 1 to 50% by weight of at least one polyetheramine comprising a polyether backbone based on propylene oxide (PO), ethylene oxide (EO), or mixed propylene oxide/ethylene oxide (PO/EO) units, and at least one primary or secondary amino group attached to the end of a polyether backbone, preferably said polyetheramine comprises at least two primary or secondary amino groups, and more preferably at least two primary amino groups, all the % relating to the total weight of the erasing composition.

BRIEF DESCRIPTION OF THE DRAWING

The FIGURE depicts a plot of temperature versus color density.

DETAILED DESCRIPTION OF THE DISCLOSURE

In the polyetheramine of the disclosure, the polyether backbone based on propylene oxide (PO), ethylene oxide (EO), or mixed propylene oxide/ethylene oxide (PO/EO) units, preferably comprises from 5 to 40 propylene oxide (PO) units and/or from 2 to 12 ethylene oxide (EO) units. The polyether backbone is more preferably based on propylene oxide (PO), and even more preferably comprises from 5 to 40 propylene oxide (PO) units.

In the polyetheramine of the disclosure, the primary or secondary amino group attached to the end of a polyether backbone is preferably a —$NH_2$ group (primary amino group) or a —$NHR_a$ group (secondary amino group), wherein $R_a$ represents a linear or branched alkyl chain comprising 1 to 6 carbon atoms. The group attached to the end of the polyether backbone is more preferably a —$NH_2$ group (primary amino group). According to a preferred embodiment, the polyether backbone comprises a —$NH_2$ group (primary amino group) attached to both ends of its backbone.

According to a preferred embodiment of the disclosure, the polyetheramine comprises at least two primary or secondary amino groups, wherein preferably the at least two amino groups are attached to the end of a polyether backbone, and wherein the amino groups are preferably —$NH_2$ groups (primary amino groups).

According to the disclosure, a polyetheramine comprising at least two amino groups can also be called a "polyetherpolyamine".

According to a preferred embodiment, the polyetheramine of the erasing composition of the disclosure has one of the following formulas (I), (II) or (III):

Formula (I)

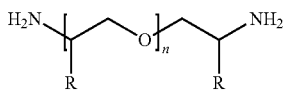

with:
n varying from 5 to 40, and
R representing H or a linear or branched alkyl chain comprising 1 to 4 carbon atoms, Formula (II)

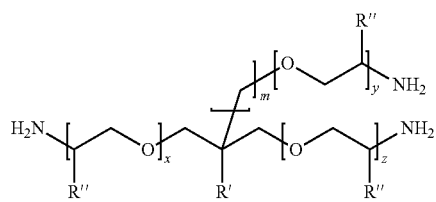

with:
m=0 or 1,
x, y and z varying from 1 to 80, and (x+y+z) varying from 3 to 90,
R' representing H or an alkyl chain comprising 1 or 2 carbon atoms, and
R" representing H or a linear or branched alkyl chain comprising 1 to 4 carbon atoms, Formula (II)

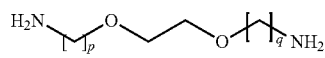

with p and q varying from 1 to 6, and preferably p=q.

According to a more preferred embodiment, the present disclosure relates to an erasing composition comprising:
(a) from 10 to 80% by weight of at least one rubber,
(b) from 20 to 80% by weight of at least one filler, and
(c) from 1 to 50% by weight of at least one polyetheramine of formula:

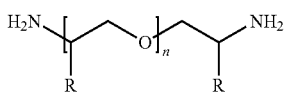

with:
n varying from 20 to 40, and
R representing H or a linear or branched alkyl chain comprising 1 to 4 carbon atoms, and preferably R is $CH_3$,
all the % relating to the total weight of the erasing composition.

The erasing composition may advantageously comprise from 20 to 70%, and more advantageously from 30 to 60%, by weight of at least one rubber (a).

The rubber (a) may be selected from ethylene-propylene-diene monomer (EPDM) rubber, vulcanized thermoplastic elastomer (TPV) which is a blend of ethylene-propylene-diene monomer (EPDM) rubber and polypropylene (PP), ethylene-propylene rubber (EPR), poly(styrene-butadiene-styrene) (SBS), styrene ethylene butylene styrene (SEBS), natural rubber or Hevea rubber (NR) which consists mainly of cis-1,4-polyisoprene, polyisoprene (IR), polyvinyl chloride, styrene-based thermoplastic elastomers including styrene-butadiene-styrene (SBS), styrene-ethylene-butylene-styrene (SEBS), styrene-ethylene-propylene-styrene (SEPS), styrene-ethylene-ethylene-propylene-styrene (SEEPS), and mixtures thereof. In a preferred embodiment, the rubber (a) is a blend of ethylene-propylene-diene monomer (EPDM) rubber and polypropylene (PP).

The erasing composition may advantageously comprise from 25 to 75%, and more advantageously from 30 to 70%, by weight of at least one filler (b).

The filler may be selected from calcium carbonate, calcium silicate, sodium sulphate, clay, talc, kaolin, silica, mica, calcite, wollastonite, bentonite, and mixtures thereof. In a preferred embodiment, the filler (b) is calcium carbonate.

The erasing composition may advantageously comprise from 1 to 30%, and more advantageously from 2 to 20%, by weight of at least one polyetheramine (c). In a preferred embodiment, the polyetheramine (c) is of formula:

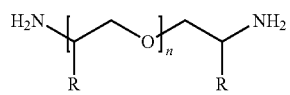

with:
n varying from 25 to 35, and
R is $CH_3$.

The erasing composition of the disclosure may further advantageously comprise from 0.1 to 20%, preferably from 0.3 to 15%, and more preferably from 0.5 to 10%, by weight of at least one pigment (d).

In an embodiment of the disclosure, the sum of the % by weight of the components (a), (b), (c), and (d), as defined according to the disclosure, represents 100%.

The pigment (d) may be advantageously selected from titanium dioxide, silicon dioxide, zirconium dioxide, zinc oxide, calcium oxide, chromium oxide, iron oxide, tin oxide, antimony oxide, zinc sulfide, cadmium sulfide, calcium sulphate, barium sulphate, phtalocyanine Blue BN (pigment blue 15), carbon black (pigment black 7), phtalocyanine Green G (pigment green 7), pigment yellow 74, pigment red 254, pigment violet 23, and mixtures thereof; the phtalocyanine Blue BN (pigment blue 15), carbon black (pigment black 7), phtalocyanine Green G (pigment green 7), pigment yellow 74, pigment red 254, pigment violet 23, being used when preparing a colored or fluorescent eraser. In a preferred embodiment, the pigment (d) is titanium dioxide.

The disclosure also relates to an erasing tool comprising as a solid core an erasing composition according to the disclosure.

The disclosure further relates to a method for preparing an erasing tool according to the disclosure comprising the steps of:
(i) preparing an erasing composition according to the disclosure by mixing, at a temperature ranging from 100 to 250° C.:
(a) from 10 to 80% by weight of at least one rubber,
(b) from 20 to 80% by weight of at least one filler, (c) from 1 to 50% by weight of at least one polyetheramine comprising a polyether backbone based on propylene oxide (PO), ethylene oxide (EO), or mixed propylene oxide/ethylene oxide (PO/EO) units, and at least one primary or secondary amino group attached to the end of a polyether backbone, preferably the polyetheramine comprises at least two primary or secondary amino groups, and more preferably at least two primary amino groups, all the % relating to the total weight of the erasing composition, and (ii) shaping, for example by pressing, injecting or extruding, the erasing composition obtained at the end of step (i), obtaining an erasing tool.

According to a preferred embodiment, the method for preparing an erasing tool according to the disclosure comprises the steps of:

(i) preparing an erasing composition according to the disclosure by mixing, at a temperature ranging from 100 to 250° C.:
(a) from 10 to 80% by weight of at least one rubber,
(b) from 20 to 80% by weight of at least one filler,
(c) from 1 to 50% by weight of at least one polyetheramine having one of the following formulas (I), (II) or (III):

Formula (I)

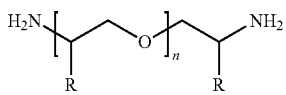

(I)

with:
n varying from 5 to 40, and
R representing H or a linear or branched alkyl chain comprising 1 to 4 carbon atoms, Formula (II)

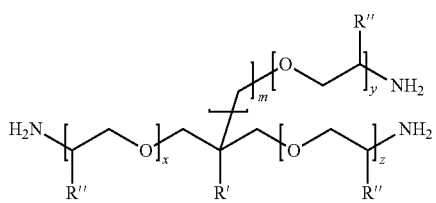

(II)

with:
m=0 or 1,
x, y and z varying from 1 to 80, and (x+y+z) varying from 3 to 90,
R' representing H or an alkyl chain comprising 1 or 2 carbon atoms, and
R" representing H or a linear or branched alkyl chain comprising 1 to 4 carbon atoms, Formula (III)

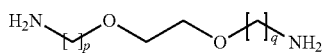

(III)

with p and q varying from 1 to 6, and
all the % relating to the total weight of the erasing composition, and (ii) shaping, for example by pressing, injecting or extruding, the erasing composition obtained at the end of step (i), obtaining an erasing tool.

According to a particularly preferred embodiment, the method for preparing an erasing tool according to the disclosure comprises the steps of:

(i) preparing an erasing composition according to the disclosure by mixing, at a temperature ranging from 100 to 250° C.:
(a) from 10 to 80% by weight of at least one rubber,
(b) from 20 to 80% by weight of at least one filler,
(c) from 1 to 50% by weight of at least one polyetheramine of formula:

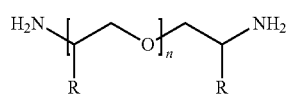

with:
n varying from 20 to 40, and preferably n varying from 25 to 35, and
R representing H or a linear or branched alkyl chain comprising 1 to 4 carbon atoms, and preferably R is $CH_3$, all the % relating to the total weight of the erasing composition, and (ii) shaping, for example by pressing, injecting or extruding, the erasing composition obtained at the end of step (i), obtaining an erasing tool.

The features previously defined for the erasing composition apply mutadis mutandis to the erasing composition implemented in the method for preparing an erasing tool of the disclosure.

Step (i) of the method for preparing an erasing tool can be carried out in a mixer stir, at a temperature ranging from 140 to 250° C., preferably from 150 to 230° C. At the mixer's output, the eraser is obtained in the form of a flexible sheet with a thickness ranging from 1 to 10 mm, preferably from 2 to 8 mm, and more preferably of around 5 mm.

Step (ii) of the method for preparing an erasing tool can be carried out at a temperature ranging from 100 to 300° C., and preferably from 140 to 230° C., thus obtaining an erasing tool in the desired shape, preferably in cylindrical or rectangular shape. When step (ii) is realized by pressing, the pressure applied may range from 10 to 300 bars, preferably from 20 to 280 bars, and more preferably from 30 to 250 bars. In this case, the pressing may last from 10 seconds to 20 minutes, preferably from 20 seconds to 10 minutes, and more preferably from 30 seconds to 8 minutes, thus obtaining an erasing tool in the desired shape, preferably in cylindrical or rectangular shape.

The use of an erasing tool according to the disclosure to irreversibly erase thermochromic ink is also part of the disclosure.

Another subject-matter of the disclosure is a writing instrument comprising:
an ink reservoir containing a thermochromic ink composition comprising color-changing core-shell microcapsules dispersed in a carrier, and
an erasing tool according to the disclosure.

For the purposes of the present disclosure, the term "ink composition" means any ink which is intended to be used in a writing instrument such as ballpoint pens, brush pens, colored pencils, markers, highlighters, chalks and felt pens; it should not be confused with a printing ink used in printing machines and which does not correspond to the same technical constraints, and thus to the same specifications. Indeed, an "ink composition" intended to be used in a writing instrument within the framework of the disclosure must not contain solid particles of which the size is greater than the channels of the writing instrument, in order to avoid blocking them, which would inevitably lead to writing being irreversibly stopped. In addition, it must not be too fluid, so as to avoid leaks during writing. However, it must be sufficiently fluid to facilitate the flow of the writing action. In addition, it must allow an ink flow rate suitable for the writing instrument used, in particular a flow rate of between 10 and 700 mg/200 m of writing, advantageously between 250 and 650 mg/200 m of writing. It must also dry sufficiently rapidly to avoid smudging the writing medium. It must also avoid the problems of migration (bleeding) over time. Thus, the ink composition of the disclosure will be suitable for the writing instrument for which it is intended.

The thermochromic ink composition of the disclosure comprises thermochromic microcapsules dispersed in the carrier which may be water or a solvent, and preferably water. When the carrier is solvent-based, high boiling organic solvents are preferably used. Examples of solvents include ethylene glycol phenyl, dimethylsulfoxide (DMSO), caprolactone, and mixtures thereof.

When the carrier is water, co-solvents may be added. The co-solvent can help improve the compatibility/solubility of the ink ingredients. Useful co-solvents include: mono-, di-, tri-ethylene glycol; mono-, di- and tri-propylene glycol; mono- and di-$C_1$-$C_{20}$alkyl-ethers of the forgoing glycols; aromatic and aliphatic alcohols including ethanol, propanol, butanol, octanol; 2-pyrrolidone; N-methyl pyrrolidone; and mixtures thereof.

The thermochromic microcapsules comprise a shell and a core, the core including an eradicable dye capable of becoming substantially colorless and/or of changing color from a first colored state to a colorless and/or second colored state. The shell is preferably frangible, i.e. the shell ruptures (rather than is plastically deformed) when heated and/or when pressure is applied thereto by mechanical action (friction). The eradicable dye of the thermochromic ink composition becomes substantially colorless and/or changes color upon coming into contact with the eraser of the disclosure (in a preferred aspect, the second color state is colorless). The thermochromic ink composition of the disclosure is therefore capable of irreversibly changing color, for example, upon application of heat and/or frictional forces during an erasure process as application of such heat and/or frictional forces can cause the shell to rupture, thereby facilitating exposure of the eradicable dye to the eraser.

For the purposes of the present disclosure, the expression "irreversibly erased thermochromic ink composition" thus refers to an ink composition capable of undergoing a color change that cannot be reversed by application of a temperature change or to an ink microcapsule including an ink composition capable of undergoing a color change that cannot be restored/reversed by application of a temperature change, when erased with an erasing tool according to the disclosure. As a result, the thermochromic ink composition of the disclosure cannot exhibit hysteresis and is considered to be irreversibly erasable.

In the writing instrument of the disclosure, the core-shell microcapsules may comprise:

an electron donative coloring organic compound (leuco-dye),
an electron accepting compound (developer), and
a reaction medium controlling the color reaction between the electron donative coloring organic compound (leuco-dye) and the electron accepting compound (developer).

In the thermochromic ink compositions of the disclosure, the increases in temperature will cause erasure of the ink, while cooling the ink will cause the color to reappear. These changes follow the scheme of the FIGURE. In this scheme, the decoloration onset temperature of the ink color is T3, the complete discoloration temperature is T4 and TG is the average temperature between T3 and T4. Conversely, the temperature at which the color of the ink begins to reappear is T2, the complete recoloration temperature is T1 and TH is the average temperature between T1 and T2. The color-change hysteresis width (ΔH) is the difference between (TH) and (TG).

In the present disclosure, the ΔH value is advantageously small, which means that only one of the two states (decolorized state or color-developed state) before and after a color change can be present at ordinary temperature. The ΔH value more advantageously ranges from 0 to 7° C., preferably from 0.2 to 5° C., and more preferably from 0.2 to 3° C.

According to a preferred embodiment, the reaction medium controlling the color reaction between the electron donative coloring organic compound (leuco-dye) and the electron accepting compound (developer) is a wax.

According to a preferred embodiment, the reaction medium controlling the color reaction between the electron donative coloring organic compound (leuco-dye) and the electron accepting compound (developer) has preferably a melting point ranging from 40 to 70° C., more preferably from 45 to 65° C.

According to a preferred embodiment, the reaction medium controlling the color reaction between the electron donative coloring organic compound (leuco-dye) and the electron accepting compound (developer) is even more preferably selected from ethylene glycol distearate, dimethyl oxalate, methyl behenate, heptadecan-9-one, 1-octadecanol, and mixtures thereof.

For the purposes of the present disclosure, the term "wax" is intended to mean a lipophilic compound, solid at room temperature (25° C.) and having a melting point of 30° C. or more.

In the present disclosure, the melting point corresponds to the transition stage between a fully crystalline or partially crystalline solid state and an amorphous liquid of variable viscosity, as described in ISO 11357-3; 2011. The term "transition", also referred to as "fusion", is characterized by an endothermic peak in the DSC curve.

The melting point of wax can be measured by differential scanning calorimetry (DSC) using a TA Instruments Q20 apparatus, on a temperature range from 20 to 90° C., at cooling/heating speeds of 10° C./minute.

This measurement is made with 5 mg of sample mass.
Method:
1. Equilibrate at 0° C.
2. Mark end of cycle
3. Ramp: 10° C./min to 90° C.
4. Isothermal for 2 min
5. Ramp: 10° C./min to 0° C.
6. Isothermal for 2 minutes
7. End of method The electron donative coloring organic compound of the core-shell microcapsules may be selected from 3-(4-diethylannino-2-ethoxyphenyl)-3-(1-ethyl-2-nnethylindol-3-yl)-4-azaphthalide (Blue 63, CAS number 69898-40-4), 2'-(dibenzylamino)-6'-(diethylamino)fluorane (CAS number 34372-72-0), N,N-dimethyl-4-[2-[2-(octyloxy)phenyl]-6-phenyl-4-pyridinyl]benzenannine (yellow CK37, CAS number 144190-25-0), 7-(4-diethylannino-2-hexyloxyphenyl)-7-(1-ethyl-2-methyl-1H-indol-3-yl)-7H-furo[3,4-b]pyridin-5-one (Blue 203, CAS number 98660-18-5), 2-(2,4-dimethylphenylamino)-3-methyl-6-diethylaminofluoran (Black 15, CAS number: 36431-22-8), and 3,3-bis-(1-butyl-2-methyl-indol-3-yl)-3H-isobenzofuran-1-one (Red 40, CAS number 50292-91-6).

The electron accepting compound of the core-shell microcapsules may be selected from 2,2-bis(4-hydroxy-3-methylphenyl)propane (Bisphenol C, CAS number 79-97-0), 4-hexyl-1,3-dihydroxybenzene (4-hexylresorcinol, CAS number 136-77-6), 4,4'-cyclohexylidenebisphenol (BPZ, CAS number 843-55-0), 4,4'-(hexafluoroisopropylidene)diphenol (Bisphenol AF, CAS number 1478-61-1), 4,4'-(1-phenylethylidene)bisphenol (CAS number 1571-75-1), 2,2'-dihydroxybiphenyl (CAS number 1806-29-7), 4,4'-(1,4-phenylenediisopropylidene)bisphenol (CAS number 2167-51-3), 1,1-bis(4-hydroxy-3-methylphenyl)cyclohexane (CAS number 2362-14-3), 9,9-bis(4-hydroxyphenyl)fluorene (CAS number 3236-71-3), 4,4'-(1,3-phenylenediisopropylidene)bisphenol (CAS number 13595-25-0), 1,1,1-tris(4-hydroxyphenyl)ethane (CAS number 27955-94-8), 4,4'-(2-ethylhexylidene)diphenol (CAS number 74462-02-5), α,α,α'-tris(4-hydroxyphenyl)-1-ethyl-4-isopropylbenzene (CAS number 110726-28-8), 3,5,4'-trihydroxy-trans-stilbene (resveratrol, CAS number 501-36-0).

The shell of the core-shell microcapsules may represent from 5 to 30 wt % of the weight of the entire microcapsule.

The shell is typically formed of a polymer. The shell can be formed of polymeric and/or non-polymeric materials including but not limited to polyureas, melamine, guanamines, polyamides, polyesters, polyurethanes, mixtures thereof, and other similar polycondensation products. According to a preferred embodiment, the shell of the core-shell microcapsules is based on polyureas, melamine, guanamines such as benzoguanamines.

The shell material may influence the microencapsulation technique used for forming the thermochromic microcapsules. Suitable encapsulation processes include known chemical and physical methods for forming polymeric capsules. Representative examples of chemical methods include complex coacervation, interfacial polymerization (IFP), polymer-polymer incompatibility, in-situ polymerization, centrifugal force process, and submerged nozzle process. Representative examples of physical methods include spray drying, fluid bed coating, centrifugal extrusion, and rotational suspension separation. The selected encapsulation method depends on the requirement of the thermochromic capsule size and encapsulation rate, which in turn is dependent on the application method.

Within the framework of the disclosure, the preferred microencapsulation technique is interfacial polymerization. In a representative interfacial polymerization process, a microcapsule wall of a polyurea, a polyamide, a polyurethane, or the like, is formed at an interface between two phases. The materials forming the capsule wall are in separate phases, one in an aqueous phase and the other in a fill phase. Polymerization occurs at the phase boundary. Thus, a polymeric capsule shell wall forms at the interface of the two phases thereby encapsulating the core material. Wall formation of polyurea, polyamide and polyurethane capsules typically proceeds via interfacial polymerization. U.S. Pat. No. 4,622,267, which is incorporated herein by reference, discloses a representative interfacial polymerization technique for preparation of microcapsules in which the core material is initially dissolved in a solvent and an aliphatic diisocyanate soluble in the solvent mixture is added. Subsequently, a nonsolvent for the aliphatic diisocyanate is added until the turbidity point is just barely reached. This organic phase is then emulsified in an aqueous solution, and a reactive amine is added to the aqueous phase. The amine diffuses to the interface, where it reacts with the diisocyanate to form polymeric polyurea shells.

The writing instrument of the disclosure is advantageously selected from ballpoint pens, brush pens, colored pencils, markers, highlighters, chalks and felt pens. In a preferred embodiment, the writing instrument is a ballpoint pen erasable by friction coloring instrument, preferably with a flow rate of between 10 and 700 mg/200 m of writing, and more preferably between 250 and 650 mg/200 m of writing.

Finally, the present disclosure relates to a method for irreversibly erasing a written line comprising the steps of:
(i') writing onto a paper with a thermochromic ink composition comprising color-changing core-shell microcapsules dispersed in a carrier, to obtain a written line, and
(ii') erasing the written line obtained at the end of step (i') with an erasing tool according to the disclosure.

The features previously defined for the thermochromic ink composition apply mutadis mutandis to the composition implemented in step (i') of the method for irreversibly erasing a written line of the disclosure.

In addition to the above provisions, the disclosure also comprises other provisions which will emerge from the remainder of the description which follows.

EXAMPLES

Preparation of Erasing Compositions:

Different erasing compositions were prepared by mixing a PP-EPDM rubber (Santoprene™, Exxonmobil Chemical), carbonate calcium ($CaCO_3$) (Durcal®, Omya), titanium dioxide ($TiO_2$) (R-KB-2, Sachtleben) and an amine, at a temperature of 170° C. during 5 minutes.

After mixing, the erasing composition obtained was calendered at a temperature of 170° C. during 5 minutes to obtain a flexible sheet. Three squares of 5×5 mm were cut in the flexible sheet and placed on each other in a mold. The eraser squares were pressed at a temperature of 185° C., under a pressure of 50 bars during 40 seconds, then under a pressure of 200 bars during 40 seconds, and in a last step under a pressure of 190 bars during 5 minutes.

After cooling, cylindrical erasing tools were obtained with a diameter of 10 mm and a height of 7 mm.

Different contents of amino-eraser were tested in the erasing compositions of Formulas A and B presented in Table 1 below:

TABLE 1

| Components | Formula A Content (wt %) | Formula B Content (wt %) |
|---|---|---|
| PP-EPDM rubber | 37.80 | 42.80 |
| $CaCO_3$ | 51.30 | 51.30 |
| $TiO_2$ | 0.90 | 0.90 |
| Amine (or zeolite (ZEO)) | 10.00 | 5.00 |

The wt % indicated are relative to the total weight of the formulation.

A standard erasing composition comprising zeolite (ZEO) was also tested.

Different natures of amino-erasing compounds were tested in the erasing compositions of Formulas A and B, as shown in Table 2:

TABLE 2

| | Amines | CAS number |
|---|---|---|
| Sample 1 | Tetradecylamine (TDA) $CH_3(CH_2)_{12}CH_2-NH_2$ | 2016-42-4 |
| Sample 2 | Tetraethylenepentamine (TEPA) | 112-57-2 |
| Sample 3 | 2,6-diethylaniline (EA) | 579-66-8 |
| Sample 4 | JEFFAMINE® D-2000 (JA) polyoxypropylenediamine (Huntsman Corporation) x = 33 | 9046-10-0 |

Preparation of a Thermochromic Ink Composition:

A slurry was prepared in a first beaker by mixing, under stirring with a bar magnet, 19.43 wt % of ethylene glycol distearate, 0.53 wt % of Blue 203, 1.05 wt % of Bisphenol AF, and 3.00 wt % of hexamethylene diisocyanate, at a temperature of 70° C. during 30 minutes. 67.01 wt % of deionized water was mixed with 1.00 wt % of polyvinyl alcohol (PVA) in an ULTRA-THURRAX® disperser, before adding the mixture of ethylene glycol distearate, Blue 203, Bisphenol AF, and 3.00 wt % of hexamethylene diisocyanate, and agitating during 3 minutes. The mixture was placed under stirring with a bar magnet during 3 minutes. 1.00 wt % of hexamethylene diamine was added and left to react with the isocyanate present in the mixture during 3 hours, to form polyurea microcapsules. A slurry of core-shell microcapsules dispersed in water was obtained, the microcapsules having a diameter $D^{v}50$ (median value for a volume distribution) of 6.6 µm and a pH of 8.4.

In a second beaker, 10 wt % of glycerin (Henry Franc), 0.19 wt % of biocide Acticide® MBS (Thor), and 0.20 wt % of tolyltriazole (Additin® RC 8221, Lanxess), were mixed under stirring with a bar magnet during 15 minutes. 0.30 wt % of xanthan gum (Jungbunzlauer) was added, and the mixture homogenized under stirring during 15 minutes. The slurry obtained previously was slowly added to the mixture, as well as 67.01 wt % of deionized water. The mixture was then homogenized under stirring during 2 hours at a temperature of 35° C. 0.30 wt % of a defoamer (Moussex® S 9092, Syntron) was added, and the mixture homogenized under stirring at a temperature of 35° C. for another 15 minutes. 1.00 wt % of polyvinylpyrrolidone (Luvitec® K17, BASF) was added, and the mixture homogenized under stirring at a temperature of 35° C. for another 15 minutes.

The thermochromic ink composition obtained was degassed under vacuum at 57 mbar at room temperature (25° C.).

Erasing Test:

The efficiency of the erasing compositions was assessed on writing marks made with the thermochromic ink composition prepared above. The thermochromic ink composition was injected into cartridges of ballpoint pen type. Manual writing marks and machine writing marks were made on a paper, and the erasing quality of the different erasing compositions was evaluated by manual erasure (by the same operator). The observations seen on the paper are detailed in Table 3:

TABLE 3

| | Erasing compositions | | | | |
|---|---|---|---|---|---|
| | Composition A-zeolite and B-zeolite | Composition A-1 and B-1 | Composition A-2 and B-2 | Composition A-3 and B-3 | Composition A-4 and B-4 |
| Erasing compounds | ZEO | TDA | TEPA | EA | JA |
| Observations | Hard and soiled very quickly | Yellow traces and slight exudation | Significant exudation | Hard and soiled very quickly | Flexible without any trace |

Composition A-zeolite means that zeolite was added in Formula A, A-1 that the sample 1 was added in Formula A, etc.

The erasing composition added with JEFFAMINE® D-2000 (JA) showed a better erasing efficiency than the standard and the erasing compositions added with other amino-erasing compounds: the erasing compositions did not show any trace or exudation (absence of phasing out of the amine from the rest of the erasing composition) and is easier to erase (required less strength to completely erase the writing marks).

The invention claimed is:

1. An erasing composition comprising:
(a) from 10 to 80% by weight of at least one rubber, (b) from 20 to 80% by weight of at least one filler, and (c) from 1 to 50% by weight of at least one polyetheramine comprising a polyether backbone based on propylene oxide, ethylene oxide, or mixed propylene oxide/ethylene oxide units, and at least one primary or secondary amino group attached to the end of the polyether backbone.

2. An erasing composition as claimed in claim 1, wherein the polyetheramine has one of the following formulas (I), (II) or (III):

Formula (I)

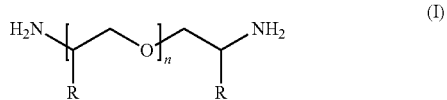
(I)

with:
n varying from 5 to 40, and
R representing H or a linear or branched alkyl chain comprising 1 to 4 carbon atoms, Formula (II)

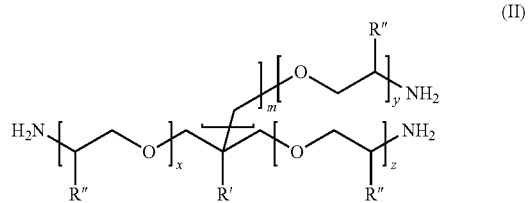
(II)

with:
m=0 or 1,
x, y and z varying from 1 to 80, and (x+y+z) varying from 3 to 90,
R' representing H or an alkyl chain comprising 1 or 2 carbon atoms, and
R" representing H or a linear or branched alkyl chain comprising 1 to 4 carbon atoms, Formula (III)

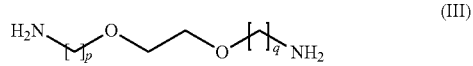
(III)

with p and q varying from 1 to 6.

3. An erasing composition as claimed in claim 1 or claim 2 comprising:
(a) from 10 to 80% by weight of at least one rubber, (b) from 20 to 80% by weight of at least one filler, and (c) from 1 to 50% by weight of at least one polyetheramine of formula:

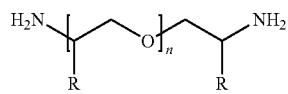

with:
n varying from 20 to 40, and
R representing H or a linear or branched alkyl chain comprising 1 to 4 carbon atoms.

4. The erasing composition as claimed in claim 1, wherein the rubber (a) is selected from ethylene-propylene-diene monomer (EPDM) rubber, Vulcanized Thermoplastic Elastomer (TPV) which is a blend of ethylene-propylene-diene monomer (EPDM) rubber and polypropylene (PP), ethylene-propylene rubber (EPR), poly(styrene-butadiene-styrene) (SBS), styrene ethylene butylene styrene (SEBS), natural rubber (NR), polyisoprene (IR), polyvinyl chloride, styrene-based thermoplastic elastomers including styrene-butadiene-styrene (SBS), styrene-ethylene-butylene-styrene (SEBS), styrene-ethylene-propylene-styrene (SEPS), styrene-ethylene-ethylene-propylene-styrene (SEEPS), and mixtures thereof.

5. The erasing composition as claimed in claim 1, wherein the filler is selected from the group consisting of calcium carbonate, calcium silicate, sodium sulphate, clay, talc, kaolin, silica, mica, calcite, wollastonite, and bentonite.

6. The erasing composition as claimed in claim 1, wherein the polyetheramine (c) is of formula:

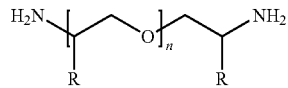

with:
n varying from 25 to 35, and
R is $CH_3$.

7. The erasing composition as claimed in claim 1, further comprising from 0.1 to 20% by weight of at least one pigment (d).

8. An erasing tool comprising as a solid core an erasing composition as claimed claim 1.

9. A method for preparing an erasing tool comprising the steps of:
(i) preparing an erasing composition as claimed in claim 1 by mixing, at a temperature ranging from 100 to 250° C.:
(a) from 10 to 80% by weight of at least one rubber,
(b) from 20 to 80% by weight of at least one filler,
(c) from 1 to 50% by weight of at least one polyetheramine comprising a polyether backbone based on propylene oxide, ethylene oxide, or mixed propylene oxide/ethylene oxide units, and at least one primary or secondary amino group attached to the end of the polyether backbone, and
(ii) shaping the erasing composition obtained at the end of step (i), obtaining an erasing tool.

10. A method for preparing an erasing tool as claimed in claim 9, wherein the at least one polyetheramine has one of the following formulas (I), (II) and (III):

Formula (I)

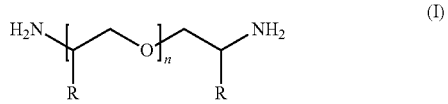
(I)

with:
n varying from 5 to 40, and
R representing H or a linear or branched alkyl chain comprising 1 to 4 carbon atoms, Formula (II)

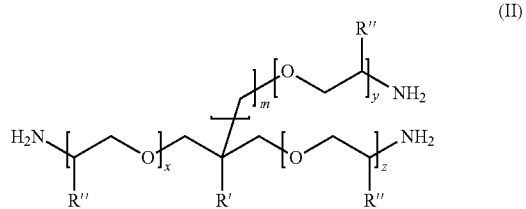
(II)

with:
m=0 or 1,
x, y and z varying from 1 to 80, and (x+y+z) varying from 3 to 90,
R' representing H or an alkyl chain comprising 1 or 2 carbon atoms, and
R'' representing H or a linear or branched alkyl chain comprising 1 to 4 carbon atoms, Formula (III)

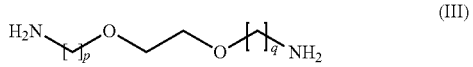
(III)

with p and q varying from 1 to 6.

11. A method for preparing an erasing tool as claimed in claim 10, wherein the at least one polyetheramine is of formula (I).

12. Method of irreversibly erasing a thermochromic ink composition on a paper, comprising contacting the thermochromic ink composition with the erasing tool as claimed in claim 8.

13. A writing instrument comprising:
an ink reservoir containing a thermochromic ink composition comprising color-changing core-shell microcapsules dispersed in a carrier, and
an erasing tool as claimed in claim 8.

14. A writing instrument as claimed in claim 13, wherein the core-shell microcapsules comprises:
an electron donative coloring organic compound,
an electron accepting compound, and
a reaction medium controlling the color reaction between the electron donative coloring organic compound and the electron accepting compound.

15. A writing instrument as claimed in claim 14, wherein the reaction medium is a wax has a melting point ranging from 40 to 70° C.

16. A writing instrument as claimed in claim 14, wherein the electron donative coloring organic compound is selected from the group consisting of 3-(4-diethylamino-2-ethoxyphenyl)-3-(1-ethyl-2-methylindol-3-yl)-4-azaphthalide (Blue 63, CAS number 69898-40-4), 2'-(dibenzylamino)-6'-(diethylamino)fluorane (CAS number 34372-72-0), N,N-dimethyl-4-[2-[2-(octyloxy)phenyl]-6-phenyl-4-pyridinyl] benzenamine (Yellow CK37, CAS number 144190-25-0), 7-(4-diethylamino-2-hexyloxyphenyl)-7-(1-ethyl-2-methyl-1H-indol-3-yl)-7H-furo[3,4-b]pyridin-5-one (Blue 203, CAS number 98660-18-5), 2-(2,4-dimethylphenylamino)-3-methyl-6-diethylaminofluoran (Black 15, CAS number: 36431-22-8), and 3,3-bis-(1-butyl-2-methyl-indol-3-yl)-3H-isobenzofuran-1-one (Red 40, CAS number 50292-91-6).

17. A writing instrument as claimed in claim 14, wherein the electron accepting compound is selected from the group consisting of 2,2-bis(4-hydroxy-3-methylphenyl)propane (Bisphenol C, CAS number 79-97-0), 4-hexyl-1,3-dihydroxybenzene (4-hexylresorcinol, CAS number 136-77-6), 4,4'-cyclohexylidenebisphenol (BPZ, CAS number 843-55-0), 4,4'-(hexafluoroisopropylidene)diphenol (Bisphenol AF, CAS number 1478-61-1), 4,4'-(1-phenylethylidene)bisphenol (CAS number 1571-75-1), 2,2'-dihydroxybiphenyl (CAS number 1806-29-7), 4,4'-(1,4-phenylenediisopropylidene)bisphenol (CAS number 2167-51-3), 1,1-bis(4-hydroxy-3-methylphenyl)cyclohexane (CAS number 2362-14-3), 9,9-bis(4-hydroxyphenyl)fluorene (CAS number 3236-71-3), 4,4'-(1,3-phenylenediisopropylidene)bisphenol (CAS number 13595-25-0), 1,1,1-tris(4-hydroxyphenyl)ethane (CAS number 27955-94-8), 4,4'-(2-ethylhexylidene)diphenol (CAS number 74462-02-5), α,α,α'-tris(4-hydroxyphenyl)-1-ethyl-4-isopropylbenzene (CAS number 110726-28-8), 3,5,4'-trihydroxy-trans-stilbene (resveratrol, CAS number 501-36-0), and wherein the shell of the microcapsules is based on polyureas, melamine, or guanamines.

18. A writing instrument as claimed in claim 14, wherein the wax is selected from the group consisting of ethylene glycol distearate, dimethyl oxalate, methyl behenate, heptadecan-9-one, 1-octadecanol, and mixtures thereof.

19. A writing instrument as claimed in claim 13, wherein the writing instrument is selected from the group consisting of a ballpoint pen, a brush pen, a colored pencil, a markers, a highlighter, a chalk and a felt pen.

20. A method for irreversibly erasing a written line comprising the steps of:
(i') writing onto a paper with a thermochromic ink composition comprising color-changing core-shell microcapsules dispersed in a carrier, to obtain a written line, and
(ii') erasing the written line obtained at the end of step (i') with an erasing tool as claimed in claim 8.

* * * * *